United States Patent
Bazant et al.

(10) Patent No.: US 10,411,284 B2
(45) Date of Patent: Sep. 10, 2019

(54) FLOW BATTERY WITH DISPERSION BLOCKER BETWEEN ELECTROLYTE CHANNEL AND ELECTRODE

(71) Applicant: Massachusetts Institute of Technology, Cambridge, MA (US)

(72) Inventors: Martin Z. Bazant, Wellesley, MA (US); William Allan Braff, Cambridge, MA (US); Cullen Richard Buie, Cambridge, MA (US); Matthew Suss, Cambridge, MA (US); Laura M. Gilson, Cambridge, MA (US); Kameron Conforti, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 128 days.

(21) Appl. No.: 14/504,539

(22) Filed: Oct. 2, 2014

(65) Prior Publication Data

US 2015/0099199 A1    Apr. 9, 2015

Related U.S. Application Data

(60) Provisional application No. 61/886,122, filed on Oct. 3, 2013.

(51) Int. Cl.
*H01M 8/18*    (2006.01)
*H01M 8/08*    (2016.01)
(Continued)

(52) U.S. Cl.
CPC ............. *H01M 8/188* (2013.01); *H01M 8/08* (2013.01); *H01M 8/1016* (2013.01);
(Continued)

(58) Field of Classification Search
CPC .. H01M 8/188; H01M 8/1016; H01M 8/1018; H01M 8/08; H01M 8/22; H01M 8/20
(Continued)

(56) References Cited

U.S. PATENT DOCUMENTS

| 4,520,081 A | * | 5/1985 | Hohne | H01M 4/96 |
| | | | | 429/105 |
| 5,304,432 A | * | 4/1994 | Townsend | B01D 61/44 |
| | | | | 429/105 |

(Continued)

FOREIGN PATENT DOCUMENTS

KR    101318331 B1 * 10/2013

OTHER PUBLICATIONS

El-kharouf et al., Ex-situ characterisation of gas diffusion layers for proton exchange membrane fuel cells, Aug. 2012, Journal of Power Sources, 218, 393-404.*

(Continued)

*Primary Examiner* — Sean P Cullen
(74) *Attorney, Agent, or Firm* — Smith Baluch LLP (57) ABSTRACT

The invention discloses general apparatus and methods for electrochemical energy conversion and storage via a membraneless laminar flow battery. In a preferred embodiment, the battery includes a flow-through porous anode for receiving a fuel and a porous electrolyte channel for transporting an electrolyte adjacent to the porous anode; a flow-through porous cathode is provided for transporting an oxidant; and a porous dispersion blocker is disposed between the electrolyte channel and the porous cathode, which inhibits convective mixing while allowing molecular diffusion and mean flow. Pore structure properties are selected for tuning convective dispersion, conductivity or other macroscopic properties. Specific materials, reactants, fabrication methods, and operation methods are disclosed to achieve stable (Continued)

charge/discharge cycles and to optimize power density and energy density.

25 Claims, 11 Drawing Sheets

(51) Int. Cl.
| | |
|---|---|
| H01M 8/1016 | (2016.01) |
| H01M 8/1018 | (2016.01) |
| H01M 8/20 | (2006.01) |
| H01M 8/22 | (2006.01) |
| H01M 4/96 | (2006.01) |

(52) U.S. Cl.
CPC .......... *H01M 8/1018* (2013.01); *H01M 8/20* (2013.01); *H01M 8/22* (2013.01); *H01M 4/96* (2013.01); *H01M 2300/0005* (2013.01); *Y02E 60/528* (2013.01)

(58) Field of Classification Search
USPC ............ 429/409, 418, 492, 495, 498, 500
See application file for complete search history.

(56) References Cited

U.S. PATENT DOCUMENTS

| | | | |
|---|---|---|---|
| 2008/0008911 A1 | 1/2008 | Strook et al. | |
| 2008/0070083 A1* | 3/2008 | Markoski ......... | H01M 8/04186 429/492 |
| 2009/0035644 A1* | 2/2009 | Markoski ............ | H01M 8/0258 429/442 |
| 2009/0092882 A1 | 4/2009 | Kjeang et al. | |
| 2010/0112391 A1* | 5/2010 | Salloum ................ | H01M 8/023 429/455 |
| 2010/0248068 A1* | 9/2010 | Sekino ................ | B23K 11/002 429/465 |
| 2011/0045385 A1* | 2/2011 | Makita .................... | H01M 4/92 429/498 |
| 2012/0070766 A1 | 3/2012 | Braff et al. | |
| 2012/0308907 A1 | 12/2012 | Peled et al. | |
| 2012/0308911 A1 | 12/2012 | Peled et al. | |
| 2013/0209916 A1* | 8/2013 | Kim ....................... | H01G 9/038 429/499 |

OTHER PUBLICATIONS

Thorson et al., Design rules for electrode arrangement in an air-breathing alkaline direct methanol laminar flow fuel cell, Jun. 2012, Journal of Power Sources, 218, 28-33.*

Hollinger et al., Nanoporous separator and low fuel concentration to minimize crossover in direct methanol laminar flow fuel cells, Dec. 2009, Journal of Power Sources, 195, 3523-3528.*

Notification of Transmittal of International Search Report and the Written Opinion of the International Searching Authority for PCT? US2014/058955, dated Mar. 10, 2015.

Notification Concerning Transmittal of International Preliminary Report on Patentability for PCT/US2014/058955 dated Apr. 14, 2016.

* cited by examiner

FLOW BATTERY WITH DISPERSION BLOCKER BETWEEN ELECTROLYTE CHANNEL AND ELECTRODE

This application claims priority to provisional application Ser. No. 61/886,122 filed on Oct. 3, 2013, the contents of which are incorporate herein by reference in their entirety.

BACKGROUND OF THE INVENTION

This invention relates to a cyclable laminar flow battery having flow-through porous electrodes along with a non-ion-perm-selective element called a "dispersion blocker" to inhibit local convection.

Laminar flow fuel cells are known in the prior art, which includes Ferrigno et al., J. Am. Chem. Soc., 2002, 124 (44), pp. 12930-12931; Choban et al., J. Power Sources 128, 54-60 (2004); Kjeang et al., US 2009/0092882; Peled et al., US 2012/0308907 and 2012/0308911; Braff, US/2012/0070766; and Cho et al., Journal of the Electrochemical Society, 2012. These cells are "membraneless" because laminar flow is used to keep reactants at one electrode from crossing over to the opposite electrode, without the use of a standard ion-perm-selective membrane barrier, as in most fuel cells and batteries.

These systems are mostly referred to as membraneless, laminar-flow "fuel cells" since they only support galvanic discharge operation and are not able to electrolytically recharge in closed-loop operation. Indeed, no prior flow battery system has been disclosed that can achieve stable closed-loop cycling with a membraneless laminar flow architecture. Most of the prior art also involves planar "flow-over" electrodes, although Cho discloses a flow-through cathode in a system with a solid ion exchange membrane. Most of the prior art also does not include attempts to control convection in the laminar flow channel, although Stroock et al., US 2008/0008911 and DaMota et al., Journal of the American Chemical Society 2012, disclose convection barriers in flow batteries that are not used with porous media or to inhibit dispersion.

SUMMARY OF THE INVENTION

The invention discloses a membraneless flow battery with at least one flow-through porous electrode. In a preferred embodiment, the flow battery according to the invention includes a porous anode for receiving a fuel and an open or porous electrolyte channel for transporting an electrolyte adjacent to the porous anode. A flow-through porous cathode for transporting an oxidant is provided, and a porous dispersion blocker is disposed between the electrolyte channel and the porous cathode, which inhibits convective mixing while allowing molecular diffusion of ions and mean fluid flow to pass through it. The porous dispersion blocker is not ion-perm-selective, in that both positive and negative ions may freely diffuse through its structure.

In a preferred embodiment, the porous anode, the porous electrolyte channel and the porous cathode have varying pore structure properties selected for tuning advective dispersion, conductivity or other macroscopic properties. The varying pore structure properties may have a smooth or discontinuous gradient in properties such as pore size distribution, loop size or pore shape.

The porous dispersion blocker, in a preferred embodiment, has a pore structure different from the pore structure of the porous anode, the porous electrolyte channel and porous cathode. In one preferred embodiment, the pores in the dispersion blocker are at least two times smaller in mean diameter than pores in the porous anode, porous electrolyte channel and porous cathode.

The flow battery of the invention may further include structure for introducing an electrolyte into the porous electrolyte channel and an oxidant into the porous cathode. The electrolyte and oxidant flows may be in the same direction or in an opposite direction. Such counterflow operation maximizes pressure drop across the electrolyte and cathode inlets.

In yet another embodiment, the laminar flow battery further includes circuitry to measure in real time voltage and current of the battery to modulate electrolyte and oxidant flow rates to optimize power output and reactant utilization.

A suitable battery chemistry is hydrogen-bromine, as will be appreciated by those of skill in the art. Many other flow battery chemistries are also possible, such as zinc-bromine, lithium-oxygen, lithium-ion, sodium-ion, vanadium redox, quinone redox, etc.

BRIEF DESCRIPTION OF THE DRAWINGS

FIGS. 6 a, b and c are graphs showing the equilibrium performance for single pass operation with fresh reactant and electrolyte streams.

FIGS. 7 a and b are graphs of voltage and voltage efficiency versus cycle number.

FIGS. 8 a, b and c illustrate numerical results showing predicted coulombic efficiency of the battery disclosed herein. The latter demonstrate the potential of our system to achieve high coulombic efficiency despite having no ion exchange element.

DESCRIPTION OF THE PREFERRED EMBODIMENT

The present invention is a flow battery with porous electrodes that uses heterogeneous porous media to comprise a liquid flow-through electrode and does not require an ion exchange element to enable cyclable energy storage and to reduce mixing of reactant streams. The present invention is thus a departure from prior art flow batteries that use homogeneous porous media for liquid electrodes and/or heterogeneous porous media only for gas electrodes. Further, our battery enables two or three-dimensional laminar flow, a departure from previous battery systems which are either one-dimensional (the most typical) and three-dimensional chaotic flow batteries.

Figure 1:
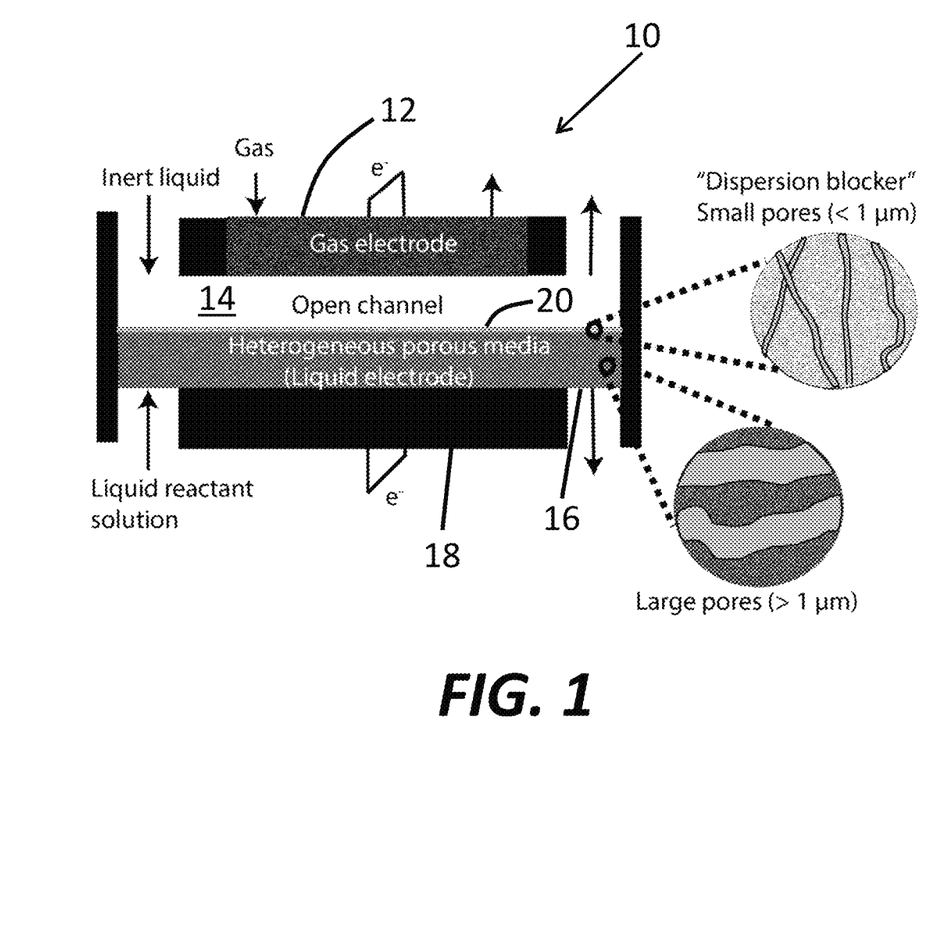
FIG. 1 is a cross-sectional, schematic illustration of an embodiment of the flow battery disclosed herein.

With reference now to FIG. 1 a flow battery 10 includes a porous gas anode 12, an open electrolyte channel 14 and a liquid cathode 16 made of a heterogeneous porous medium. The porous electrodes 12 and 16 may be made of porous carbon, such as carbon paper, carbon aerogels, carbon nanotube mats or porous graphene. A graphite current collector 18 is disposed adjacent the cathode 16. A dispersion blocker 20 is disposed between the electrolyte channel 14 and the porous cathode 16. The electrolyte channel 14 may be made of porous PTFE.

The porous anode 12 and the porous cathode 16 may have varying pore structure properties that can allow for tuning advective dispersion, conductivity and other macroscopic properties of the porous media. The porous structures 12 and 16 may have a smooth or discontinuous gradient in properties such as pore size distribution, loop site or pore shape in order to affect local flow and concentration fields.

The dispersion blocker 20 is a thin layer that inhibits local flow through its thickness. The pore structure of the dispersion blocker 20 is different from the abutting porous media such that advective mixing through the dispersion blocker 20 is inhibited while mean flow is uninhibited. In a preferred embodiment, the dispersion blocker has pores that are at least two times smaller in mean diameter than pores of the abutting porous media. Typically, the dispersion blocker 20 has small pores (<1 μm). A suitable dispersion blocker is a microporous polymeric material such as polypropylene or PTFE.

In this embodiment the electrolyte (inert liquid) and oxidant (liquid reactant solution) flow in the same direction and mixing is minimized through the presence of the dispersion blocker 20. The electrolyte flows through the open channel 14 in between the porous anode 12 and the dispersion blocker 20. The dispersion blocker 20 contains a pore structure that varies from the rest of the liquid electrode, and is not ion selective as are commonly used ion exchange membranes. The variation in pore structure achieves a reduction in crossover flux due to dispersion and diffusive sources, and so enables high coulombic efficiency operation without the requirement for ion exchange membranes. Further, the dispersion blocker 20 inhibits advection of solvent, and enables a pressure drop across its bulk. As such, the velocities and pressures of the two liquid flows do not have to be matched, and can be tuned independently for optimized performance.

Figure 2:
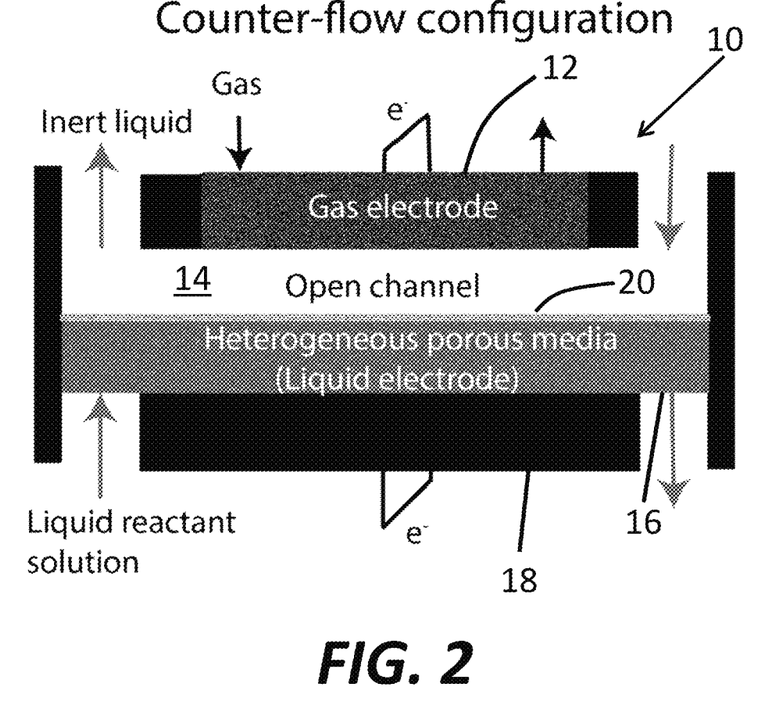
FIG. 2 is a cross-sectional, schematic illustration of an embodiment of a flow battery using counter flow operation.

FIG. 2 is another embodiment of the invention illustrating counter flow operation. This embodiment is identical to that shown in FIG. 1 except that the electrolyte and oxidant flow in opposite directions, and thus the maximum pressure across the dispersion blocker 20 is at the exit of the electrolyte channel rather than at the inlet of this channel (as in a co-flow configuration).

Figure 3:
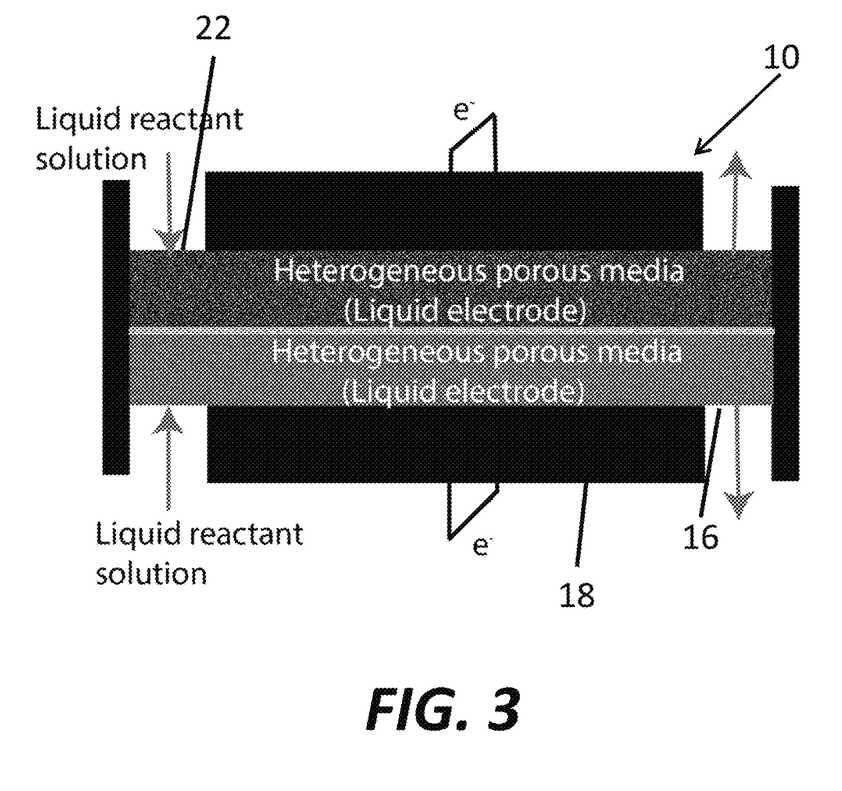
FIG. 3 is a cross-sectional, schematic illustration of another embodiment of the flow battery disclosed herein using two liquid electrodes made of a heterogeneous porous medium.

FIG. 3 is yet another embodiment of the invention using two liquid electrodes 16 and 22. In this embodiment a liquid fuel flows through the heterogeneous porous anode 22 while liquid oxidant flows through the heterogeneous porous cathode 16. The cell depicted in FIG. 3 can be run in co-flow configuration (as depicted) or in counter-flow.

Figure 4:
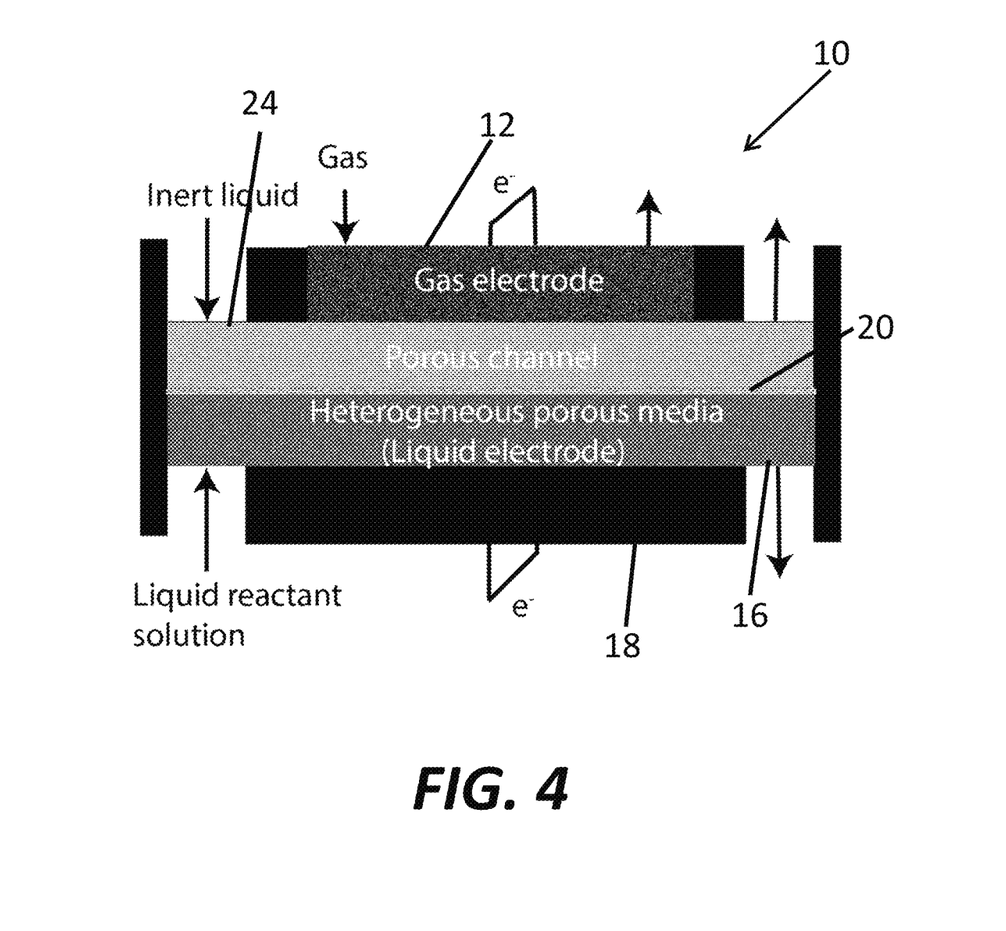
FIG. 4 is a schematic illustration of an embodiment of the invention using a porous channel to support the inert liquid (electrolyte).

FIG. 4 is another embodiment using a porous channel 24. The cell depicted in FIG. 4 can be run in co-flow configuration (as depicted) or in counter-flow.

Figure 5:
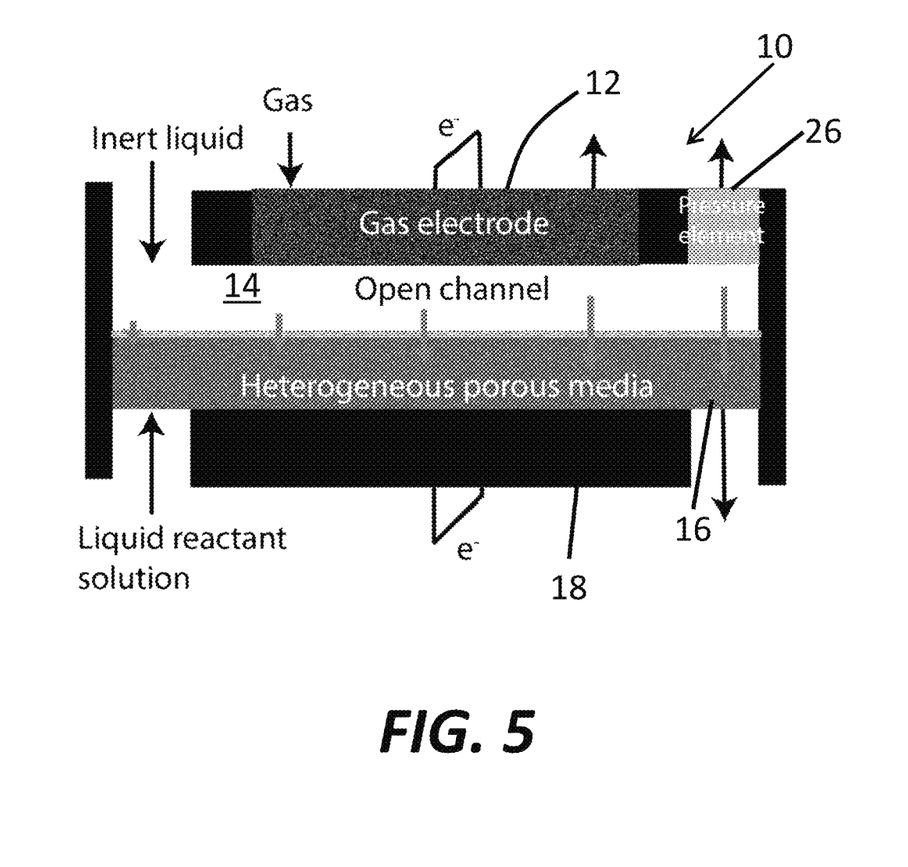
FIG. 5 is a cross-sectional, schematic illustration of another embodiment of the invention showing two-dimensional flow and pressure element usage.

FIG. 5 is another embodiment of the invention showing 2D flow and a pressure element 26 for pressurizing the open channel 14. In this embodiment the pressure drop along the electrolyte flow differs from the oxidant flow, which can be used to further prevent transport of oxidant to the anode 12 by causing some flow to pass from the electrolyte channel into the porous cathode. Two dimensional flow can also be achieved using a porous element in the electrolyte channel, and counter-flow configurations can also be used.

It should be clear to those skilled in the art that many different types of porous media could be used in different embodiments of the invention. For example, the dispersion blocker and adjacent porous electrode and/or porous electrolyte could be made from a monolithic solid porous material with varying pore structure, such as porous ceramics made from sintering or pressing layers of particles with different sizes and chemical compositions, such as alumina, silica, zirconia, grains or fiberglass for the electrolyte or dispersion blocker layers; porous polymeric materials made by functionalizing, crosslinking, or curing powders of polymeric particles of different compositions and sizes, such as PTFE or PE; porous materials and mats made by electrospinning or electrospraying; composite porous materials with conformal polymeric coatings throughout the bulk or in surface layers made by dip or spray layer-by-layer deposition of charged polymers in order to decrease pore size and control surface properties; porous metallic materials made from foams, aerogels, crosslinked or fused particles such as carbon, MXene, graphite, nickel, platinum, titanium, copper, gold, aluminum, or other metallic nanotubes, fibers, and flakes.

Figure 6A:
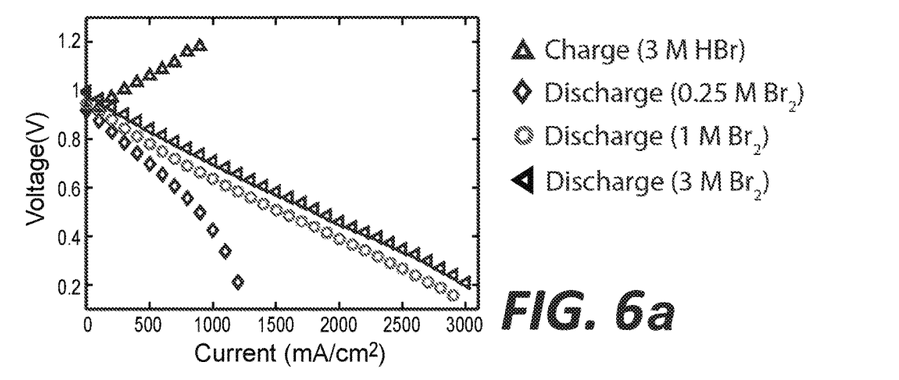
Figure 6B:
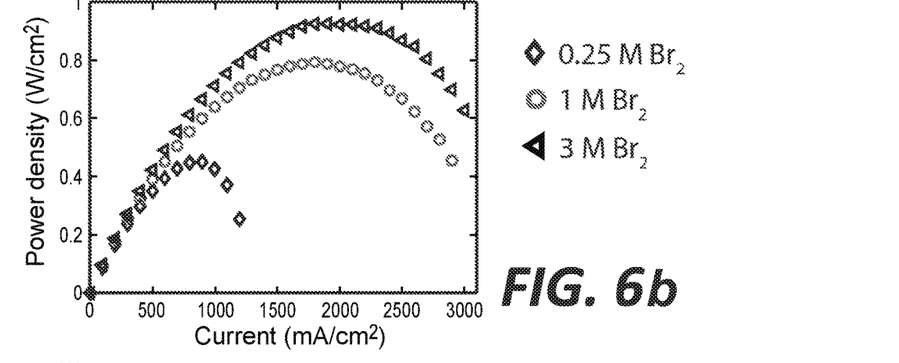
Figure 6C:
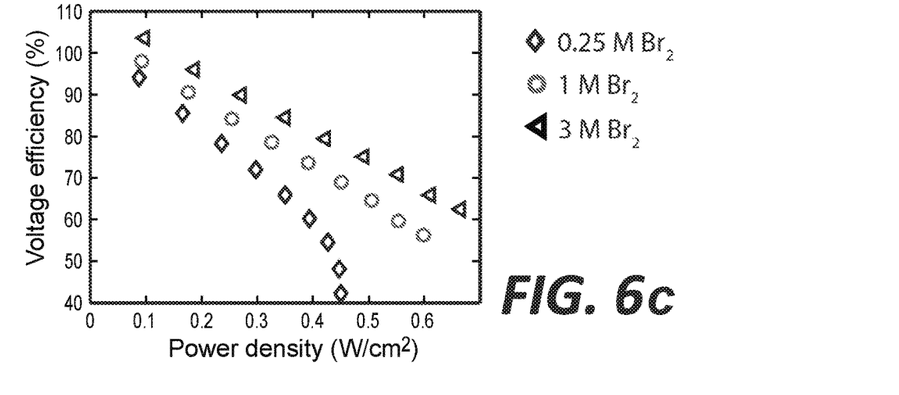

FIGS. 6 a, b and c are graphs of experiments showing single pass performance and power density of a battery according to an embodiment of the invention based on hydrogen-bromine electrochemistry. During discharge, hydrogen gas is fed to a porous anode with platinum catalyst and oxidized to protons in hydrobromic acid electrolyte, while liquid bromine and tribromide ions dissolved in hydrobromic acid are fed to a flow-through porous carbon paper cathode without any catalyst. A thin celgard polyethylene layer plays the role of the dispersion blocker between the porous cathode and an open electrolyte channel, defined by spacers. The power density achieved and voltage efficiency achieved are shown. FIG. 6a includes charging data for 3M HBr. Discharge curves are shown for varying oxidant concentration (here bromine).

Figure 7:
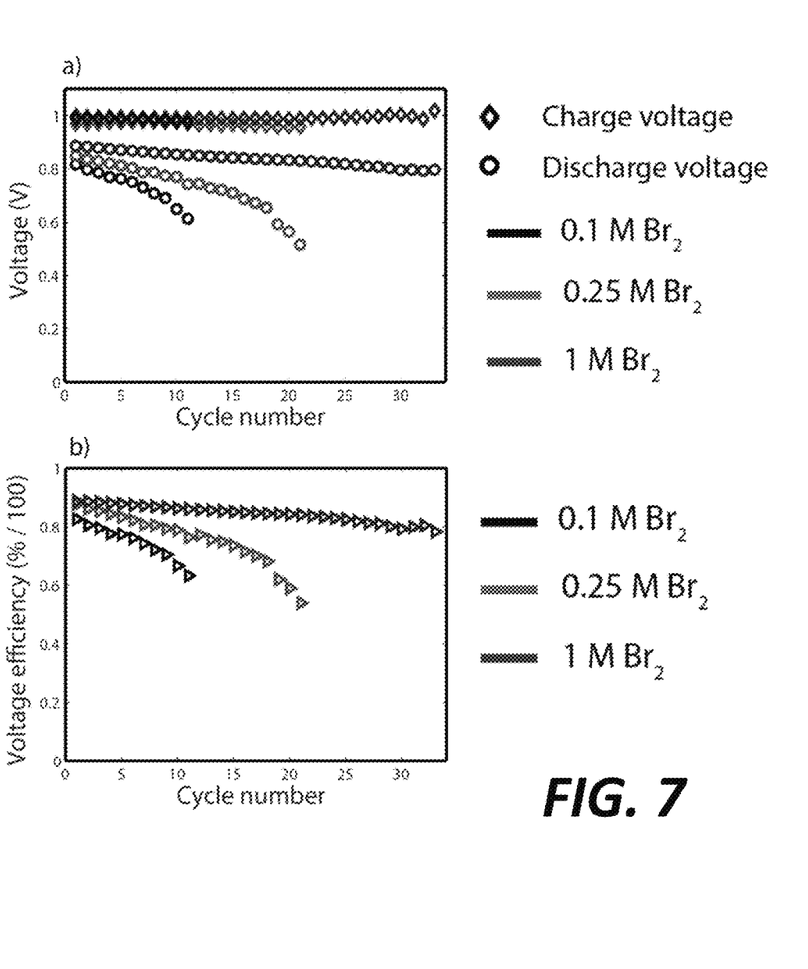
Figure 8:
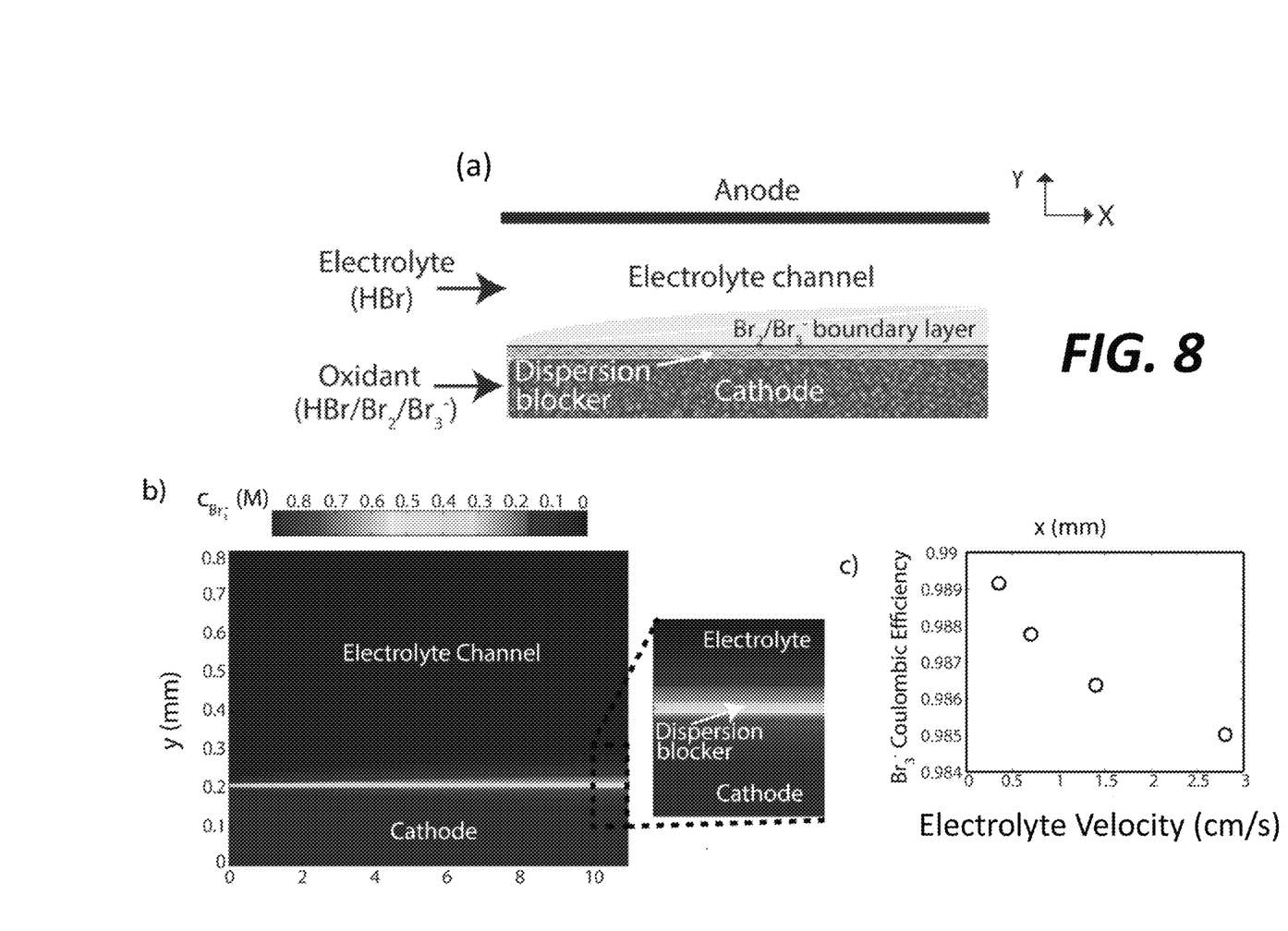

FIGS. 7 and 8 show cyclability and coulombic efficiency of an embodiment actually reduced to practice. Cyclic operation was achieved by re-cycling liquid oxidant and electrolyte streams at each cycle, while maintaining a constant charging or discharging current of 0.2 A/cm$^2$. These results are a demonstration of concept that our design allows for cycling and high voltage efficiency despite having no ion exchange element.

Figure 9:
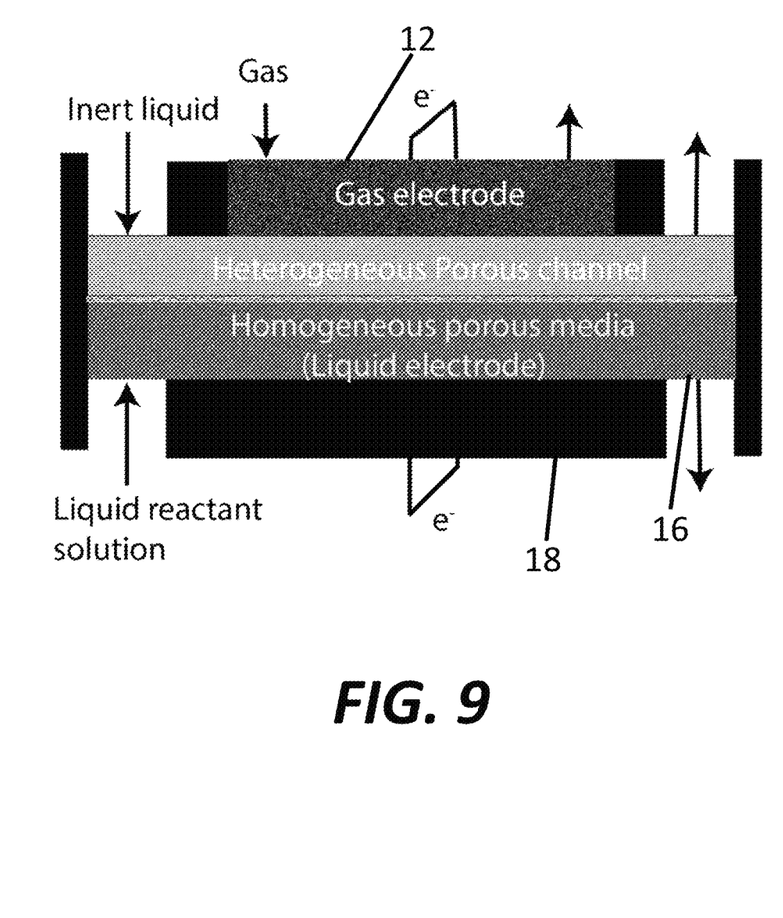
FIG. 9 is a cross-sectional, schematic illustration showing a further embodiment where the porous electrolyte channel is heterogeneous, and the porous electrode is homogeneous.
Figure 10:
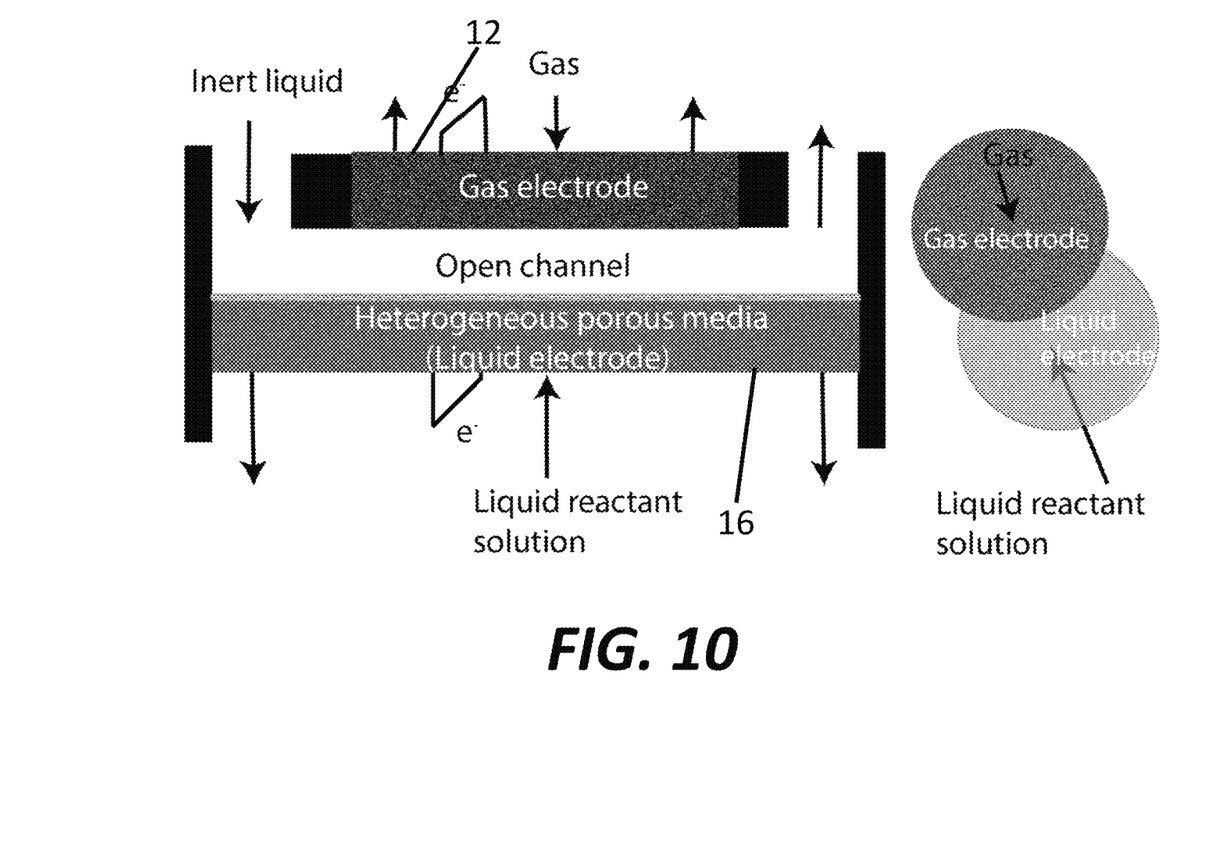
FIG. 10 is a cross-sectional illustration showing a further embodiment wherein flows through cylindrical geometry porous media are injected at the center of the porous structures, and flow outwards towards the edges of the cylinders.
Figure 11:
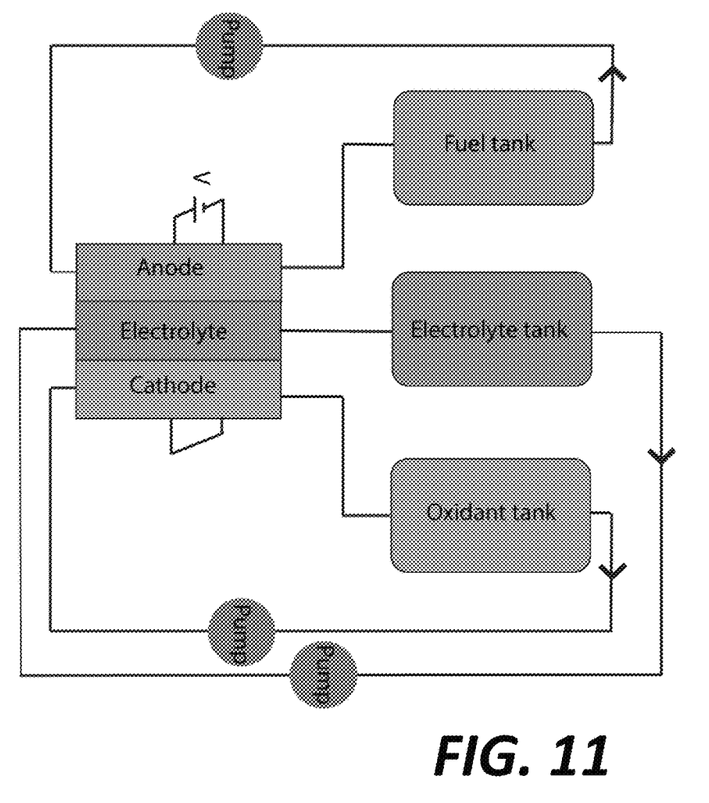
FIG. 11 is a block diagram showing various storage tanks and flow paths for an embodiment of the invention.

FIGS. 9 and 10 show additional embodiments of the invention disclosed herein, among many other variations that should be clear to one skilled in the art. FIG. 11 discloses an arrangement of fuel, electrolyte and oxidant tanks along with pumps to circulate the fluids through the anode, electrolyte channel and cathode, respectively.

In another aspect, the invention uses real-time measurements of the voltage and/or current of a membrane-less electrochemical cell to individually modulate the electrolyte and reactant flow rates to optimize power output and reactant utilization. In particular, the amount of reactant fed into the cell is modulated while maintaining a constant total flow rate to maximize reactant utilization. The reactant feed may be modulated while maintaining a constant total flow rate to minimize reactant cross over.

It is recognized that modifications and variations of the invention disclosed herein will be apparent to those of ordinary skill in the art and it is intended that all such variations and modifications be included within the scope of the appended claims.

What is claimed is:

1. A flow battery comprising:
   a porous anode to receive a fluid fuel during discharge;
   a porous cathode to receive a fluid oxidant during discharge;
   a porous electrolyte channel to transport a liquid electrolyte between the porous anode and the porous cathode, the porous electrolyte channel having a first plurality of pores; and
   a porous dispersion blocker placed between the electrolyte channel and at least one of the porous anode or the porous cathode, the porous dispersion blocker having a second plurality of pores with a mean diameter at least two times smaller than the first plurality of pores in the porous electrolyte channel and a third plurality of pores in at least one of the porous anode or the porous cathode,
   wherein the fluid fuel flows through the porous anode, the fluid oxidant flows through the porous cathode, and the liquid electrolyte flows through the porous electrolyte channel.

2. A flow battery comprising:
   a porous anode for receiving a fluid fuel during discharge;
   a porous cathode for receiving a fluid oxidant during discharge; and
   a porous dispersion blocker placed between the porous anode and the porous cathode, the porous dispersion blocker being configured to inhibit convective mixing between the porous anode and the porous cathode, while allowing molecular diffusion and mean flow,
   wherein the porous dispersion blocker is not ion-permselective,
   wherein the porous anode comprises a flow-through anode configured to flow through the fluid fuel and the porous cathode comprises a flow-through cathode configured to flow through the fluid oxidant,
   wherein the flow battery is rechargeable,
   wherein the porous anode is formed from a first homogeneous monolithic solid porous material and the porous cathode is formed from a second homogeneous monolithic solid porous material, the first homogeneous monolithic solid porous material and the second homogeneous monolithic solid porous material each having at least one varying pore structure property selected for tuning at least one of convective dispersion, diffusion flux, conductivity, and liquid velocity.

3. The battery of claim 2, wherein the battery can operate in reverse to convert electrical energy to chemical energy in the form of the fluid fuel and the fluid oxidant.

4. The battery of claim 2, wherein the fluid oxidant includes bromine, the liquid electrolyte includes hydrobromic acid, and the fluid fuel includes hydrogen.

5. The battery of claim 2, wherein the at least one varying pore structure property has a smooth or discontinuous gradient, the at least one varying pore structure property including at least one of pore size distribution, porosity, tortuosity, loop size or pore shape.

6. The battery of claim 2, further including structure for introducing the fluid oxidant mixed with an electrolyte into the porous cathode.

7. The battery of claim 6, wherein the structure is configured to flow the fluid oxidant mixed with the electrolyte through the dispersion blocker along a two dimensional direction perpendicular to a direction of the mean flow.

8. The battery of claim 2, wherein the porous dispersion blocker has a first pore structure different from a second pore structure of the porous anode and porous cathode.

9. The battery of claim 8, wherein pores in the dispersion blocker have a first mean diameter at least two times smaller than a second mean diameter of pores in at least one of the porous anode and porous cathode.

10. A flow battery comprising:
    a porous anode for receiving a fluid fuel during discharge;
    a porous cathode for receiving a fluid oxidant during discharge;
    a porous electrolyte channel for transporting a liquid electrolyte between the porous anode and the porous cathode, the porous electrolyte channel being formed from a solid porous material that contacts the porous anode and the porous cathode; and
    a porous dispersion blocker placed between the electrolyte channel and at least one of the porous anode or the porous cathode, the porous dispersion blocker being configured to inhibit convective mixing between said electrolyte channel and the at least one of the porous anode or the porous cathode, while allowing molecular diffusion and mean flow,
    wherein the porous anode comprises a flow-through anode configured to flow through the fluid fuel, the flow-through anode having a first inlet for the fluid fuel to enter the flow-through anode and a first outlet for the fluid fuel to exit the flow-through anode and the porous cathode comprises a flow-through cathode configured to flow through the fluid oxidant, the flow-through cathode having a second inlet for the fluid oxidant to enter the flow-through cathode and a second outlet for the fluid oxidant to exit the flow-through cathode,
    wherein the flow battery is rechargeable,
    wherein the porous electrolyte channel has a third inlet for the liquid electrolyte to enter the porous electrolyte channel and a third outlet for the liquid electrolyte to exit the porous electrolyte channel.

11. The battery of claim 10 wherein the flow battery is configured to operate in reverse to convert electrical energy to chemical energy in the form of the fluid fuel and the fluid oxidant.

12. The battery of claim 10, wherein the fluid oxidant includes bromine, the liquid electrolyte includes hydrobromic acid and the fluid fuel includes hydrogen.

13. The battery of claim 10, wherein the porous anode or the porous cathode includes at least one of a flowable liquid electrode or a semi-solid electrode.

14. The battery of claim 10, wherein the porous electrolyte channel and the porous cathode are configured such that the liquid electrolyte and the fluid oxidant flow in opposite directions.

15. The battery of claim 10, further including circuitry to measure in real time voltage and/or current of the battery to modulate a first flow rate of the liquid electrolyte and a second flow rate of the fluid oxidant to optimize power output and reactant utilization.

16. The battery of claim 10, wherein the porous electrolyte channel and the porous cathode are configured to introduce a flow of at least one of the liquid electrolyte or the fluid oxidant through the dispersion blocker along a two-dimensional flow direction perpendicular to a direction of the mean flow.

17. The battery of claim 10, wherein the porous dispersion blocker has a first pore structure different from a second pore structure of at least one of the porous anode, the porous electrolyte channel, and porous cathode.

18. The battery of claim 17, wherein pores in the dispersion blocker have a first mean diameter at least two times smaller than a second mean diameter of pores in at least one of the porous anode, the porous electrolyte channel or the porous cathode.

19. The battery of claim 17, wherein the dispersion blocker comprises a monolithic solid porous material, the porous electrolyte channel comprises the monolithic solid porous material, and the porous anode or the porous cathode comprises the monolithic solid porous material, wherein the dispersion blocker, the porous electrolyte channel, and the monolithic solid porous material have a varying pore structure, the monolithic solid porous material comprising at least one of:
  porous ceramics including layers of particles with different sizes and chemical compositions;
  porous polymeric materials including powders of polymeric particles of different compositions and sizes;
  composite porous materials including a bulk and conformal polymeric coatings throughout the bulk; or
  porous metallic materials including at least one of foams, aerogels, crosslinked particles or fused particles.

20. The battery of claim 19, wherein the dispersion blocker includes a conformal polymer layer deposited on a surface of at least one of the porous anode, the porous cathode, or the porous electrolyte channel.

21. The battery of claim 10, wherein the porous anode, the porous electrolyte channel or the porous cathode have at least one varying pore structure property selected for tuning at least one of convective dispersion, diffusion flux, conductivity, and liquid velocity.

22. The battery of claim 21, wherein the at least one varying pore structure property has a smooth or discontinuous gradient, the at least one varying pore structure property including at least one of pore size distribution, porosity, tortuosity, loop size or pore shape.

23. The battery of claim 10, wherein the porous electrolyte channel and the porous cathode are configured such that the liquid electrolyte and the fluid oxidant flow in opposite directions to maximize pressure drop across the third inlet of the porous electrolyte channel and the second inlet of the porous cathode.

24. The battery of claim 23, further including a flow resistance in the third outlet for the liquid electrolyte to pressurize the porous electrolyte channel.

25. The battery of claim 24 wherein the flow resistance comprises at least one of a porous ceramic filter or a polymeric filter, the at least one of the porous ceramic filter or the polymeric filter comprising at least one of porous PTFE, polyethylene, silica, alumina, zirconia, and SiC.

* * * * *